Jan. 6, 1970    J. B. KIRGIS ET AL    3,487,971
CRYOGENIC TANK SUPPORTING SYSTEM
Filed May 1, 1968    2 Sheets-Sheet 1
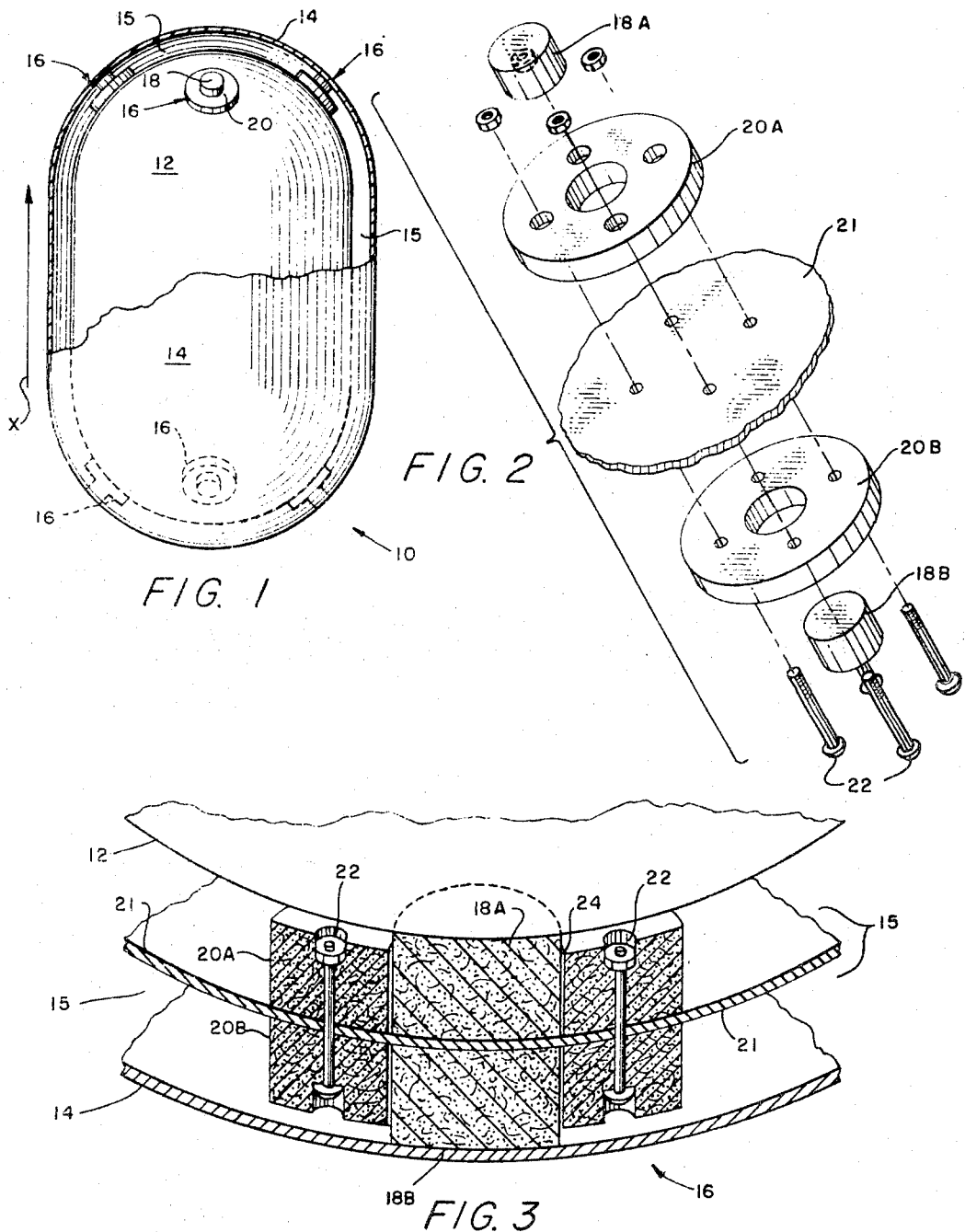
INVENTOR.
JERRY B. KIRGIS
JAMES M. LESTER
LEWIS L. GAY
BY Hubert Miller
ATTORNEY

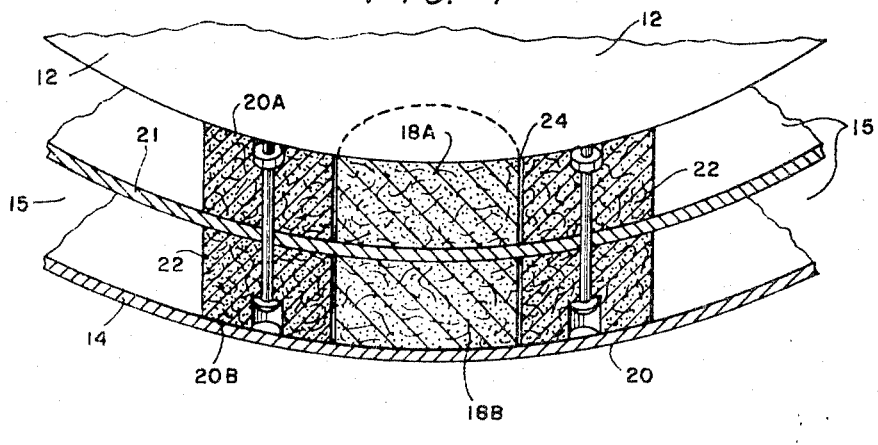

() # United States Patent Office 3,487,971
Patented Jan. 6, 1970

3,487,971
CRYOGENIC TANK SUPPORTING SYSTEM
Jerry B. Kirgis, James M. Lester, and Lewis L. Gay, Boulder, Colo., assignors to Beech Aircraft Corporation, Wichita, Kans., a corporation of Delaware
Filed May 1, 1968, Ser. No. 725,750
Int. Cl. B65d 25/18
U.S. Cl. 220—15                          10 Claims

ABSTRACT OF THE DISCLOSURE

The invention is a composite, multi-part, resilient support pad, a plurality of which constitute a resilient supporting and spacing system for the inner vessel of a dual walled vacuum type container for cryogenic liquids. A central core of each pad has less resistance to compression, and serves to absorb minor shocks and jolts created by container movement, while a surrounding washer type element of lesser thickness than the central core has greater resistance to compression, and serves to absorb and assume large shock or continuous loads after the central core has been fully compressed.

---

The storage of cryogenic fluids, which must be maintained at extremely low temperatures (oxygen −297° F.), is customarily handled in Dewar-type containers. These containers are formed by an inner and outer vessel with an evacuated space therebetween which contains some type of insulation or shielding. Structures of this type minimize heat transfer by both conduction and radiation, from the atmosphere to the liquefied gas stored within the inner vessel.

When cryogenic storage containers are used in outer space travel, the insulation system between the inner and outer walls of the container must not only be highly efficient, but the tank strutcure must be capable of withstanding vibrations and heavy "g" loadings during launch and re-entry. In order to provide the necessary physical strength to support the inner and outer vessels in proper relationship, substantial supports must be placed between the vessels. In the prior art the supports between the vessel walls have permitted direct heat conduction, and such containers have consequently not been efficient during prolonged missions in outer space. Other support methods have included a complex mechanical support structure and retracts, breaking continuous physical contact with the inner vessel wall once the vehicle is traveling in an essentially zero "g" loading environment. Systems of this type require some form of an actuator to retract the supports, along with a power system to control the actuator.

The present invention is a very simplified system compared with that just mentioned, and has an extremely high thermal efficiency under low "g" loads such as those encountered in space travel.

It is therefore a primary objective of the present invention to provide a cryogenic tank support system for containers used in space missions, which can withstand the high "g" force loading during launch, yet which provides a minimum of vaporization loss during orbital space travel.

Another object of the present invention is to provide a supporting means which cushions the inner vessel from vibrations and severe shock during launch and re-entry of a space vehicle.

A further object of the present invention is to provide a composite resilient support element, constructed of low density fiber glass, capable of withstanding very heavy loads without exceeding its elastic limit, yet providing very low thermal conductivity.

A still further object of the invention is to provide a composite supporting pad with certain ones of its elements having different compressive moduli, to resiliently support the inner vessel of a dual walled container under varying inertia loads.

Further objects and advantages of the invention will be apparent when the following description is read in connection with the accompanying drawings, in which:

FIG. 1 is an elevational view of a typical cylindrical type cryogenic container with portions of the outer vessel broken away to illustrate the positioning of supporting pads which embody the invention;

FIG. 2 is an exploded view of a composite supporting pad embodying the invention, divided by a fragmentary portion of a heat reflective shield;

FIG. 3 is a central sectional view, on an enlarged scale, of a similar composite supporting pad installed between the walls of the inner and outer vessels of a cryogenic tank, and supporting a heat shield in the space between the two walls;

FIG. 4 is a view similar to FIG. 3 with the pad shown under a heavy inertia load; and FIG. 5 is a central sectional view of a modified form of supporting pad embodying the invention.

Referring now to the drawings, FIG. 1 illustrates a cylindrical type cryogenic container generally identified by reference numeral 10. This type of container is intended to insulate and store cryogenic fluids in environments of widely varying external conditions, and under various gravitational loads. The container 10, which could also be spherical in shape, comprises an inner vessel 12 adapted to contain the cryogenic fluids, and an outer vessel 14, surrounding the inner vessel, and defining an evacuated insulating space 15 therebetween. Positioned between the walls of the two vessels are a series of resilient pads 16 which provide the necessary suport to retain the two vessels in their proper spaced relation. Since the container 10 is primarily subjected to longitudinal loadings, in the direction indicated by arrow X, the pads 16 are located in groups of four, equally spaced angularly around each end of the container.

Various details of the container 10 not related to the invention, such as the fluid entry conduit, have been omitted from the drawings for reasons of simplicity and clarity.

FIG. 1 EMBODIMENT

Each pad includes one resilient fiber glass element, designated as a whole by the numeral 18 (FIG. 1), which has relatively low resistance to compression. It has a length which is slightly greater than the normal spacing between the walls of the inner and outer vessels 12 and 14, so that it is precompressed longitudinally when installed, so that the opposite ends of the upper elements 18 maintain continuous contact with the inner and outer vessel walls during repeated compressions and releases, due to relative movement of the inner and outer vessels.

Each pad also includes an associated resilient fiber glass element, designated as a whole by the numeral 20, which has much higher resistance to compression. Element 20 has a length or thickness considerably less than the normal spacing between the walls of the inner and outer vessels.

It will thus be seen that when minor shocks and jolts tend to move the heavily loaded inner vessel 12 toward the wall of the outer vessel 14, these shocks are absorbed by the various easily compressible and resilient elements 18 and if a large inertia force is applied to the inner vessel the elements 18 are compressed until the force created load is assumed by the various elements 20 (FIG. 1), which have greater resistance to compression.

FIGS. 3 and 4 EMBODIMENT

In FIG. 3 the element 18 is shown as being divided into mating cooperating parts 18A and 18B, installed on opposite sides of a reflective heat shield 21, by means of an adhesive. Due to precompression of the parts 18A and 18B during installation, they serve to support the heat shield in spaced relation to the walls of the inner and outer vessels.

Similarly, the element 20 is divided transversely into two mating cooperating parts 20A and 20B, which are also installed on opposite sides of heat shield 21, and are supported thereby out of contact with the walls of the inner and outer vessels. Parts or sections 20A and 20B are held in assembled relationship by means of non-metallic bolts 22, which have a low thermal conductivity, and which pass through the shield 21.

The heat shield is made of thin metal having highly reflective surfaces, and preferably surrounds the inner vessel 12, and passes through each pad 16, as shown in FIG. 3. The purpose of the shield is to reduce heat transfer by radiation through the evacuated space 15, without increasing conductive heat transfer. With the pads 16 installed as described, the only path of conductive heat transfer to the inner vessel 12 is through the elements 18.

As in the previously described embodiment, when the container 10 is subjected to a substantial "g" loading, such as during launch periods, the elements 18 will compress until the entire load is assumed by the elements 20, as shown in FIG. 4.

The elements 20 are formed of a more dense fiber glass and therefore have a higher compressive modulus then the elements 18. The elements 20, while still retaining properties of resiliency, have a much increased compressive strength capable of supporting inertia loadings as high as 9 g. The resiliency of materials of this type maintain a low material frequency so the inner vessel 12 is dynamically isolated from high level random vibrations, which occur over 100 c.p.s. A material such as Owens-Corning Fiberglas uncured AA fiber with a No. 700 Silicone binder, has given favorable results. The required density of elements 18 and 20 are controlled by the molding pressure during the cure process.

While the two portions 20A and 20B of the element 20 are held in place by bolts 22, the two portions 18A and 18B are fastened to shield 21 by an adhesive. The elements 18 and 20 are preferably separated from each other by a vacuum space 24, which prevents any conductive heat transfer between them. Under a heavy "g" loading, as illustrated in FIG. 4, the annular elements 20 will also be compressed, which necessitates recessing the ends of bolts 22.

With both of the elements 18 and 20 of the lower pads 16 in supporting contact with the vessel walls, the thermal efficiency is greatly reduced. The conductive path then includes the more dense annular elements 20, along with the compressed elements 18, providing higher thermal conductivity and contacting area. Since the timer period during launching is very short, compared with the duration of the overall mission, this efficiency loss is of minor importance. When the space vehicle has attained orbital flight, in an essentially zero "g" environment, the compressed center elemets 18 will lift the inner vessel 12 out of contact with the annular elements 20, thus returning to the FIG. 3 position. In this position the supporting system returns to its condition of increased thermal efficiency suitable for prolonged space flight.

FIG. 5 MODIFICATION

In this figure the center element 25 only, contacts the outer vessel 14. Under low "g" loads the inner vessel 12 is supported through element 25, loading plate 26, and the upper portion 20A of the annular element 20. Under heavy "g" loadings the center element 25 will compress and the load will be essentially transferred to the composite annular element 20, as portion 20B comes in contact with the wall of the outer vessel 14. The opening 27 permits a heavy screw (not shown) to be threaded into aperture 27 of the loading plate 26 to preload the center element 25 during assembly. After the vessels 12 and 14 are assembled, the screw is removed and the opening 27 in the outer vessel is sealed by welding.

The reflective heat shield 21, shown in FIGS. 2 to 5, can be of the type illustrated in prior U.S. Patent No. 3,347,056. In that structure the fluid entry and delivery conduits are in substantial contact with the highly reflective shield, and the shield is thus cooled by conduction. Such a cooled shield 21, passing through the center of the pad elements 18 and 20, would cool the elements, and would thus give the supporting system an increased thermal efficiency.

Having described the invention with sufficient clarity to enable those familiar with the art to construct and use it, we claim:

1. A system for supporting the inner vessel of a dual walled vacuum type liquid container under widely varying inertia forces comprising a plurality of spaced supports each of which include:
    a first compressible element of fibrous resilient material position between the walls of the inner and outer vessels of the container, having a low modulus of compressibility, and aiding in resiliently supporting the inner vessel from the outer vessel of the container under low inertia loads; and
    a second compressible element of fibrous resilient material, similarly position and disposed proximate said first element, said second element having a higher modulus of compressibility than that of the first element and being of a size to normally contact only one of said vessels when positioned between them, and aiding to support the inner vessel only under high inertia loads, after the first element has been substantially compressed.

2. A suspension system as set forth in claim 1, wherein the first element has a lower thermal conductivity than the second, and the second eleement provide a path of increased thermal conductivity only when it is supporting the inner vessel, whereby there is a minimum of heat transfer between the vessels at low inertia loads.

3. A suspension system as set fosth in claim 1, wherein the elements are constructed of low density fiber glass, with a resilient binder.

4. The suspension system described in claim 1,
    in which the first element extends between and has its opposite ends in continuous precompressed contact with the respective walls of the inner and outer vessels of the container and constitutes a central or core portion of a composition inner vessel supporting pad, and
    in which the second element constitutes a hollow cylindrical portion of said composite pad, and surrounds said first element, and is maintained in position thereby.

5. The suspension system described in claim 4, in which the opposite ends of the first element are bonded to the respective adjacent wall surfaces of the inner and outer vessels of the container.

6. A suspension system as set forth in claim 1,
    in which the first element has an uncompressed length greater than the distance between the vessels, and the second element has an uncompressed length less than the distance between the vessels.

7. A container for storing cryogenic fluid under varying inertia loads comprising:
    an inner vessel adapted to contain a cryogenic fluid;
    an outer vessel encompassing the inner vessel and defining therewith an evacuated insulating space surrounding the inner vessel;
    a plurality of resilient thermally low-conductive supporting means for the inner vessel constructed of resilient non-metallic material and positioned between the walls of the two vessels, and each supporting means comprising:

a first element supporting the inner vessel under low inertia loads;

a second element positioned proximate the first element providing support between the vessels under heavy inertia loads after the first element has been substantially compressed;

the first element having lower thermal conductivity and a lower compressive modulus than the second element, whereby the first element provides resilient support for the inner vessel under low inertia loads and under such loads provides the only continuous path of conductive heat transfer between the vessel walls, consequently providing a minimum of heat transfer during low inertia loads.

8. A container as set forth in claim 7 in which:

each supporting means is constructed of low density fiber glass, and a resilient binder, and the second element has a lesser uncompressed thickness than the first element, whereby the second element is simultaneously in contact with the walls of both vessels only under high inertia loads.

9. A container as set forth in claim 7 including at least two supporting means positioned at the respective opposite ends of the vessels, and acting in opposition to each other, the first element of each supporting means being precompressed under zero inertia loads.

10. A system for supporting the inner vessel of a dual walled vacuum type liquid container under widely varying inertia forces comprising a plurality of thermally low-conductive spaced supports each of which includes:

a first resilient compressible non-metallic support element extending between and having its opposite ends in precompressed contact with the respective walls of the inner and outer vessels of the container, said first element having a relatively low modulus of compressibility;

a second resilient compressible non-metallic support element positioned proximate the first element in the space between the walls of the inner and outer vessels, second element having a higher modulus of compressibility than that of the first element and being of a length less than the distance between the two vessel walls so that it is normally in contact with not more than one of said walls, whereby the first element supports the inner vessel from the outer vessel under low inertia loads, shocks and the like, and the second element assumes support of the inner vessel when it is under high inertia loads, after the inner vessel has compressed the first element to a sufficient degree, and thereafter the inner vessel is supported by both said elements.

References Cited

UNITED STATES PATENTS

| | | | |
|---|---|---|---|
| 956,810 | 5/1910 | Lamasney et al. | 62—372 X |
| 1,956,323 | 4/1934 | Gregg. | |
| 2,184,336 | 12/1939 | Devine | 220—15 X |
| 2,700,458 | 1/1955 | Brown. | |
| 3,043,466 | 7/1962 | Gardner | 220—14 |
| 3,093,260 | 6/1963 | Macormack et al. | 220—15 X |
| 3,230,726 | 1/1966 | Berner et al. | 62—45 |
| 2,131,792 | 10/1938 | Coakley | 220—15 |

JOSEPH R. LECLAIR, Primary Examiner

J. R. GARRETT, Assistant Examiner

U.S. Cl. X.R.

62—45